United States Patent
Lightner et al.

(10) Patent No.: US 9,201,744 B2
(45) Date of Patent: Dec. 1, 2015

(54) FAULT TOLERANT ARCHITECTURE FOR DISTRIBUTED COMPUTING SYSTEMS

(71) Applicant: QBASE, LLC, Reston, VA (US)

(72) Inventors: Scott Lightner, Leesburg, VA (US); Franz Weckesser, Spring Valley, OH (US)

(73) Assignee: QBASE, LLC, Reston, VA (US)

( * ) Notice: Subject to any disclaimer, the term of this patent is extended or adjusted under 35 U.S.C. 154(b) by 0 days.

(21) Appl. No.: 14/557,951

(22) Filed: Dec. 2, 2014

(65) Prior Publication Data
US 2015/0154079 A1    Jun. 4, 2015

Related U.S. Application Data

(60) Provisional application No. 61/910,856, filed on Dec. 2, 2013.

(51) Int. Cl.
*G06F 11/00* (2006.01)
*G06F 11/20* (2006.01)

(52) U.S. Cl.
CPC .......... *G06F 11/2023* (2013.01); *G06F 11/203* (2013.01)

(58) Field of Classification Search
CPC .................................... G06F 11/2023–11/2033
See application file for complete search history.

(56) References Cited

U.S. PATENT DOCUMENTS

| | | | |
|---|---|---|---|
| 6,128,660 A | 10/2000 | Grimm et al. | |
| 6,178,529 B1 * | 1/2001 | Short et al. | 714/51 |
| 6,266,781 B1 * | 7/2001 | Chung et al. | 714/4.1 |
| 6,353,926 B1 | 3/2002 | Parthesarathy et al. | |
| 6,738,759 B1 | 5/2004 | Wheeler et al. | |
| 6,832,737 B2 | 12/2004 | Karlsson et al. | |
| 7,058,846 B1 * | 6/2006 | Kelkar et al. | 714/4.4 |

(Continued)

FOREIGN PATENT DOCUMENTS

WO    2013/003770 A2    1/2013

OTHER PUBLICATIONS

International Search Report and Written Opinion of the International Searching Authority dated Apr. 15, 2015 corresponding to International Patent Application No. PCT/US2014/068002, 10 pages.

(Continued)

*Primary Examiner* — Joseph Kudirka
(74) *Attorney, Agent, or Firm* — Eric L. Sophir; Dentons US LLP

(57) ABSTRACT

Disclosed here is a fault tolerant architecture suitable for use with any distributed computing system. A fault tolerant architecture may include any suitable number of supervisors, dependency managers, node managers, and other modules distributed across any suitable number of nodes. In one or more embodiments, supervisors may monitor the system using any suitable number of heartbeats from any suitable number of node managers and other modules. In one or more embodiments, supervisors may automatically recover failed modules in a distributed system by moving the modules and their dependencies to other nodes in the system. In one or more embodiments, supervisors may request a configuration package from one or more dependency managers installing one or more modules on a node. In one or more embodiments, one or more modules may have any suitable number of redundant copies in the system, where redundant copies of modules in the system may be stored in separate nodes.

14 Claims, 3 Drawing Sheets

(56) References Cited

U.S. PATENT DOCUMENTS

| | | | |
|---|---|---|---|
| 7,370,323 B2 | 5/2008 | Marinelli et al. | |
| 7,421,478 B1 * | 9/2008 | Muchow | 709/209 |
| 7,447,940 B2 * | 11/2008 | Peddada | 714/11 |
| 7,543,174 B1 * | 6/2009 | van Rietschote et al. | 714/47.2 |
| 7,681,075 B2 * | 3/2010 | Havemose et al. | 714/15 |
| 7,818,615 B2 * | 10/2010 | Krajewski et al. | 714/13 |
| 7,899,871 B1 | 3/2011 | Kumar et al. | |
| 8,055,933 B2 * | 11/2011 | Jaehde et al. | 714/4.11 |
| 8,122,026 B1 | 2/2012 | Laroco et al. | |
| 8,341,622 B1 | 12/2012 | Eatough | |
| 8,345,998 B2 | 1/2013 | Malik et al. | |
| 8,356,036 B2 | 1/2013 | Bechtel et al. | |
| 8,375,073 B1 | 2/2013 | Jain | |
| 8,423,522 B2 | 4/2013 | Lang et al. | |
| 8,429,256 B2 | 4/2013 | Vidal et al. | |
| 8,726,267 B2 | 5/2014 | Li et al. | |
| 8,782,018 B2 | 7/2014 | Shim et al. | |
| 8,995,717 B2 | 3/2015 | Cheng et al. | |
| 9,009,153 B2 | 4/2015 | Khan et al. | |
| 2001/0037398 A1 | 11/2001 | Chao et al. | |
| 2002/0165847 A1 | 11/2002 | McCartney et al. | |
| 2002/0174138 A1 | 11/2002 | Nakamura | |
| 2003/0028869 A1 | 2/2003 | Drake et al. | |
| 2003/0112792 A1 | 6/2003 | Cranor et al. | |
| 2003/0158839 A1 | 8/2003 | Faybishenko et al. | |
| 2003/0182282 A1 | 9/2003 | Ripley | |
| 2004/0027349 A1 | 2/2004 | Landau et al. | |
| 2004/0143571 A1 | 7/2004 | Bjornson et al. | |
| 2004/0153869 A1 | 8/2004 | Marinelli et al. | |
| 2004/0205064 A1 | 10/2004 | Zhou et al. | |
| 2004/0215755 A1 | 10/2004 | O'Neill | |
| 2005/0192994 A1 | 9/2005 | Caldwell et al. | |
| 2006/0101081 A1 | 5/2006 | Lin et al. | |
| 2006/0294071 A1 | 12/2006 | Weare et al. | |
| 2007/0005639 A1 | 1/2007 | Gaussier et al. | |
| 2007/0203693 A1 | 8/2007 | Estes | |
| 2007/0203924 A1 | 8/2007 | Guha et al. | |
| 2007/0240152 A1 | 10/2007 | Li et al. | |
| 2007/0250519 A1 | 10/2007 | Fineberg et al. | |
| 2007/0282959 A1 | 12/2007 | Stern | |
| 2008/0010683 A1 | 1/2008 | Baddour et al. | |
| 2008/0027920 A1 | 1/2008 | Schipunov et al. | |
| 2009/0019013 A1 | 1/2009 | Tareen et al. | |
| 2009/0043792 A1 | 2/2009 | Barsness et al. | |
| 2009/0049038 A1 | 2/2009 | Gross | |
| 2009/0089626 A1 | 4/2009 | Gotch et al. | |
| 2009/0094484 A1 | 4/2009 | Son et al. | |
| 2009/0240682 A1 | 9/2009 | Balmin et al. | |
| 2009/0292660 A1 | 11/2009 | Behal et al. | |
| 2009/0299999 A1 | 12/2009 | Loui et al. | |
| 2009/0322756 A1 | 12/2009 | Robertson et al. | |
| 2010/0077001 A1 | 3/2010 | Vogel et al. | |
| 2010/0138931 A1 | 6/2010 | Thorley et al. | |
| 2010/0223264 A1 | 9/2010 | Bruckner et al. | |
| 2010/0235311 A1 | 9/2010 | Cao et al. | |
| 2010/0274785 A1 | 10/2010 | Procopiuc et al. | |
| 2011/0071975 A1 | 3/2011 | Friedlander et al. | |
| 2011/0093471 A1 | 4/2011 | Brockway et al. | |
| 2011/0119243 A1 | 5/2011 | Diamond et al. | |
| 2011/0125764 A1 | 5/2011 | Carmel et al. | |
| 2011/0296397 A1 | 12/2011 | Vidal et al. | |
| 2012/0030220 A1 | 2/2012 | Edwards et al. | |
| 2012/0059839 A1 | 3/2012 | Andrade et al. | |
| 2012/0102121 A1 | 4/2012 | Wu et al. | |
| 2012/0117069 A1 | 5/2012 | Kawanishi et al. | |
| 2012/0131139 A1 | 5/2012 | Siripurapu et al. | |
| 2012/0246154 A1 | 9/2012 | Duan et al. | |
| 2012/0310934 A1 | 12/2012 | Peh et al. | |
| 2012/0323839 A1 | 12/2012 | Kiciman et al. | |
| 2013/0132405 A1 | 5/2013 | Bestgen et al. | |
| 2013/0166480 A1 | 6/2013 | Popescu et al. | |
| 2013/0166547 A1 | 6/2013 | Pasumarthi et al. | |
| 2013/0290232 A1 | 10/2013 | Tsytsarau et al. | |
| 2013/0303198 A1 | 11/2013 | Sadasivam et al. | |
| 2014/0013233 A1 | 1/2014 | Ahlberg et al. | |
| 2014/0022100 A1 | 1/2014 | Fallon et al. | |
| 2014/0156634 A1 | 6/2014 | Buchmann et al. | |
| 2014/0244550 A1 | 8/2014 | Jin et al. | |
| 2014/0351233 A1 | 11/2014 | Crupi et al. | |
| 2015/0074037 A1 | 3/2015 | Sarferaz | |

OTHER PUBLICATIONS

International Search Report and Written Opinion dated Mar. 6, 2015 corresponding to International Patent Application No. PCT/US2014/067993, 9 pages.

International Search Report and Written Opinion dated Mar. 10, 2015 corresponding to International Patent Application No. PCT/US2014/067999, 10 pages.

International Search Report and Written Opinion dated Feb. 24, 2015 corresponding to International Patent Application No. PCT/US2014/067918, 10 pages.

International Search Report and Written Opinion dated Mar. 3, 2015 corresponding to International Patent Application No. PCT/US2014/067921, 10 pages.

* cited by examiner

FAULT TOLERANT ARCHITECTURE FOR DISTRIBUTED COMPUTING SYSTEMS

CROSS-REFERENCE TO RELATED APPLICATIONS

This application is related to U.S. patent application Ser. No. 14/557,794, entitled "Method for Disambiguating Features in Unstructured Text," filed Dec. 2, 2014; U.S. patent application Ser. No. 15/558,300, entitled "Event Detection Through Text Analysis Using Trained Event Template Models," filed Dec. 2, 2014; U.S. patent application Ser. No. 14/557,807, entitled "Method for Facet Searching and Search Suggestions," filed Dec. 2, 2014; U.S. patent application Ser. No. 14/558,055, entitled "Design and Implementation of Clustered In-Memory Database," filed Dec. 2, 2014; U.S. patent application Ser. No. 14/557,827, entitled "Real-Time Distributed In Memory Search Architecture," filed Dec. 2, 2014; U.S. patent application Ser. No. 14/558,009, entitled "Dependency Manager for Databases," filed Dec. 2, 2014; U.S. patent application Ser. No. 14/558,055, entitled "Pluggable Architecture for Embedding Analytics in Clustered In-Memory Databases," filed Dec. 2, 2014; U.S. patent application Ser. No. 14/558,101, entitled "Non-Exclusionary Search Within In-Memory Databases," filed Dec. 2, 2014; and U.S. patent application Ser. No. 14/557,900, entitled "Data record compression with progressive and/or selective decompression," filed Dec. 2, 2014; each of which are incorporated herein by reference in their entirety.

TECHNICAL FIELD

The present disclosure relates in general to databases architectures, and more particularly to a fault tolerant system architectures.

BACKGROUND

Computers are powerful tools of use in storing and providing access to vast amounts of information. Databases are a common mechanism for storing information on computer systems while providing easy access to users. Typically, a database is an organized collection of information stored as "records" having "fields" of information. (e.g., a restaurant database may have a record for each restaurant in a region, where each record contains fields describing characteristics of the restaurant, such as name, address, type of cuisine, and the like).

Often, databases may use clusters of computers in order to be able to store and access large amounts of data. This may require that the state of the computer clusters be managed. One approach that may be taken when attempting to solve this problem is to employ a team of professionals that may have access to the tools necessary to maintain the system either on-site or remotely. However, there may be a number of obstacles that must be faced when attempting to use such a method with databases of a larger scale.

As such, there is a continuing need for improved methods of fault tolerance and high availability at a large scale.

SUMMARY

Disclosed here is a fault tolerant architecture suitable for use with any distributed computing system. A fault tolerant architecture may include any suitable number of supervisors, dependency managers, node managers, and other modules distributed across any suitable number of nodes to maintain desired system functionality, redundancies and system reliability while sub-components of the system are experiencing failures. The present disclosure describes a fault tolerant architecture suitable for use with any distributed computing system. An example of a distributed computing system may be an in-memory database, but other distributed computing systems may implement features described herein. Systems and methods described herein provide fault-tolerance features for a distributed computing system, by automatically detecting failures and recovering from the detected failures by moving processing modules and each of the modules' associated dependencies (software, data, metadata, etc.) to other computer nodes in the distributed computing system capable of hosting the modules and/or the dependencies.

In one embodiment, a computer-implemented method comprises monitoring, by a computer comprising a processor executing a supervisor module, a heartbeat signal generated by a node manager monitoring one or more software modules stored on a node, wherein the heartbeat signal contains binary data indicating a status of each respective software module monitored by the node manager; detecting, by the computer, a failed software module in the one or more software modules of the node based on the heartbeat signal received from the node manager of the node; automatically transmitting, by the computer, to the node manager of the node a command instructing the node to restore the failed software module, in response to detecting the failed software module; and determining, by the computer, whether the node manager successfully restored the module based on the heartbeat signal received from the node manager.

In another embodiment, a computer-implemented method comprises continuously transmitting, by a computer, a heartbeat signal to a supervisor node; restoring, by the computer, the failed module when receiving a restore command; and transmitting, by the computer, a restored status signal to the supervisor node when the computer detects the module is restored.

In another embodiment, a fault-tolerant distributed computing system comprising: one or more nodes comprising a processor transmitting a heartbeat signal to a supervisor node and monitoring execution of one or more software modules installed on the node; and one or more supervisor nodes comprising a processor monitoring one or more heartbeat signals received from the one or more nodes, and determining a status of each respective node based on each respective heartbeat signal.

Numerous other aspects, features of the present disclosure may be made apparent from the following detailed description. Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

Figure 1:
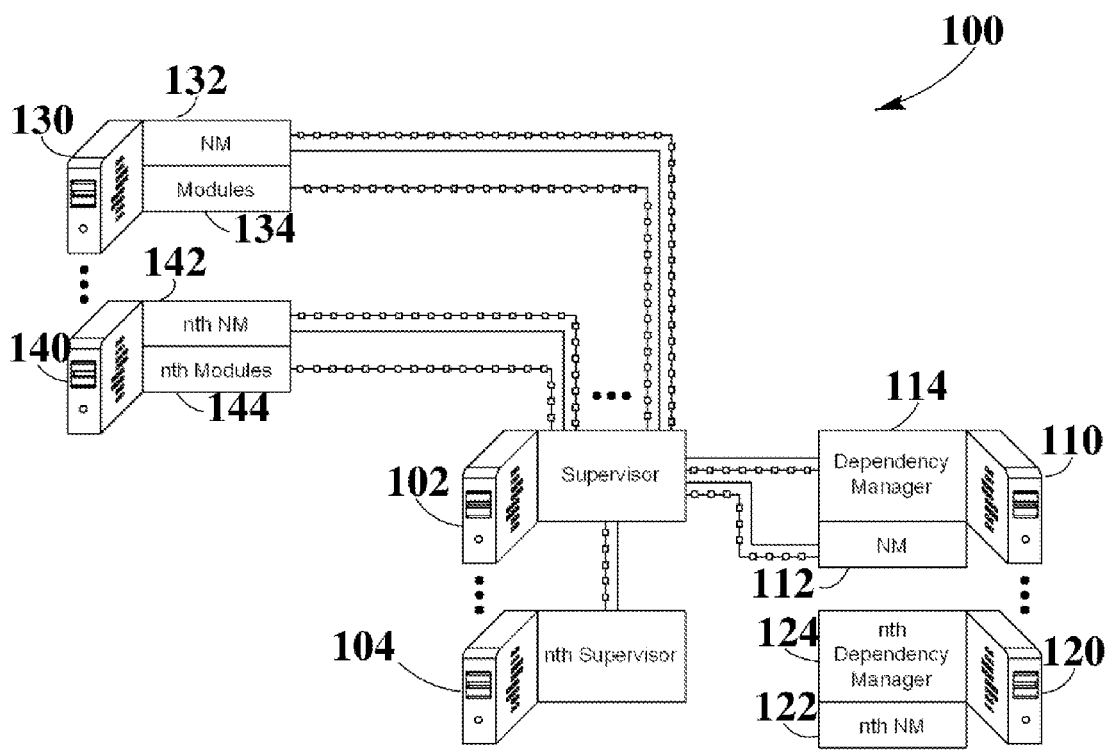
FIG. 1 shows components of a distributed system management architecture, according to an exemplary system embodiments.

As used here, the following terms may have the following definitions:

"Node" refers to a computer hardware configuration suitable for running one or more modules.

"Cluster" refers to a set of one or more nodes.

"Module" refers to a computer software component suitable for carrying out one or more defined tasks.

"Collection" refers to a discrete set of records.

"Record" refers to one or more pieces of information that may be handled as a unit.

"Field" refers to one data element within a record.

"Partition" refers to an arbitrarily delimited portion of records of a collection.

"Schema" refers to data describing one or more characteristics one or more records.

"Search Manager" refers to a module configured to at least receive one or more queries and return one or more search results.

"Analytics Module" refers to a module configured to at least receive one or more records, process said one or more records using one or more analytics methods, and return the resulting one or more processed records.

"Analytics Agent" refers to nodes storing and executing one or more analytics modules.

"Search Conductor" refers to a module configured to at least run one or more queries on a partition and return the search results to one or more search managers.

"Node Manager" refers to a module configured to at least perform one or more commands on a node and communicate with one or more supervisors.

"Supervisor" refers to a module configured to at least communicate with one or more components of a system and determine one or more statuses.

"Heartbeat" refers to a signal communicating at least one or more statuses to one or more supervisors.

"Partitioner" refers to a module configured to at least divide one or more collections into one or more partitions.

"Dependency Manager" refers to a module configured to at least include one or more dependency trees associated with one or more modules, partitions, or suitable combinations, in a system; to at least receive a request for information relating to any one or more suitable portions of said one or more dependency trees; and to at least return one or more configurations derived from said portions.

"Database" refers to any system including any combination of clusters and modules suitable for storing one or more collections and suitable to process one or more queries.

"Query" refers to a request to retrieve information from one or more suitable partitions or databases.

"Memory" refers to any hardware component suitable for storing information and retrieving said information at a sufficiently high speed.

"Fragment" refers to separating records into smaller records until a desired level of granularity is achieved.

"Resources" refers to hardware in a node configured to store or process data. In one or more embodiments, this may include RAM, Hard Disk Storage, and Computational Capacity, amongst others.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

An in-memory database is a database storing data in records controlled by a database management system (DBMS) configured to store data records in a device's main memory, as opposed to conventional databases and DBMS modules that store data in "disk" memory. Conventional disk storage requires processors (CPUs) to execute read and write commands to a device's hard disk, thus requiring CPUs to execute instructions to locate (i.e., seek) and retrieve the memory location for the data, before performing some type of operation with the data at that memory location. In-memory database systems access data that is placed into main memory, and then addressed accordingly, thereby mitigating the number of instructions performed by the CPUs and eliminating the seek time associated with CPUs seeking data on hard disk.

In-memory databases may be implemented in a distributed computing architecture, which may be a computing system comprising one or more nodes configured to aggregate the nodes' respective resources (e.g., memory, disks, processors). As disclosed herein, embodiments of a computing system hosting an in-memory database may distribute and store data records of the database among one or more nodes. In some embodiments, these nodes are formed into "clusters" of nodes. In some embodiments, these clusters of nodes store portions, or "collections," of database information.

The present disclosure describes a fault tolerant architecture suitable for use with any distributed computing system. An example of a distributed computing system may be an in-memory database, but other distributed computing systems may implement features described herein. Systems and methods described herein provide fault-tolerance features for a distributed computing system, by automatically detecting failures and recovering from the detected failures by moving processing modules and each of the modules' associated dependencies (software, data, metadata, etc.) to other computer nodes in the distributed computing system capable of hosting the modules and/or the dependencies.

In one or more embodiments, supervisors may receive heartbeats from any suitable number of node managers and other modules. In one or more embodiments, this may allow the one or more supervisors to monitor the status of one or more nodes and/or modules in a distributed computing system. Additionally, supervisors may send commands to any suitable number of node managers. In one or more embodiments, supervisors may request a configuration package from one or more dependency managers installing one or more modules on a node, where a configuration package contains all dependencies for a component, including software modules, data and metadata.

In one or more embodiments, one or more modules may have any suitable number of redundant copies in the system, where redundant copies of modules in the system may exist on separate nodes.

Fault handling may include detecting module failure when one or more heartbeats are no longer detected. In one or more embodiments, supervisors may then detect if the associated node manager is functioning and may attempt to restart the module. If one or more attempts to restart the failed module on the existing node do not restore the module, the supervisor may automatically migrate that module and its dependencies to a different node and restart the module there. In one or more embodiments, if the node manager is not functioning the node may be flagged as having failed on a GUI or similar representation. In the case of node failure, the supervisor may migrate all functionality currently targeted to the failed node to other nodes across the cluster.

In one or more embodiments, if no resources are available but resources may be made available while maintaining a desired redundancy, the resources may be made available and the modules may be installed on the resources.

Fault Tolerant Architecture

System Connections

FIG. 1 shows fault tolerant architecture 100, including supervisor 102, nth supervisor 104, first dependency node 110, dependency node manager 112, dependency manager 114, nth dependency node 120, nth dependency node manager 122, nth dependency manager 124, first node 130, node manager 132, modules 134, nth node 140, nth node manager 142, and nth modules 144. Some embodiments, such as the exemplary system 100 of FIG. 1, may logically organize nodes into a plurality of clusters. However, some embodiments may have one logical cluster, if any.

In one or more embodiments, a first cluster may include a supervisor 102 and up to nth supervisor 104. Each supervisor 102 may be a software module executed by a node, such as a computing device, comprising network interface components, such as a network interface card (NIC), suitable for facilitating communications between the supervisor 102 module and one or more nodes in a second cluster. The second cluster may include first dependency node 110 and up to nth dependency node 120, where first dependency node 110 may include node manager 112 and dependency manager 114 and nth dependency node 120 may include nth node manager 122 and nth dependency manager 124. Supervisors in said first cluster may additionally have any suitable number of connections suitable for communicating with one or more nodes in a third cluster including first node 130 and up to nth node 140, where first node 130 may include node manager 132 and any suitable number of modules 134, and nth node 140 may include nth node manager 142 and any suitable number of nth modules 144.

One or more supervisors 102 may receive heartbeats from one or more node managers 112, one or more dependency managers 114, and any suitable number of node managers 132 and modules 134. In one or more embodiments, this may allow the one or more supervisors 102 to monitor the status of one or more nodes and/or modules in a distributed computing system. Additionally, supervisors 102 may transmit one or more suitable commands to any suitable number of node managers 112 and any suitable number of node managers 132.

In one or more embodiments, supervisors 102 may request a configuration package from one or more dependency nodes 110 when installing one or more modules 134 on one or more nodes 130.

Node Configuration

Figure 2:
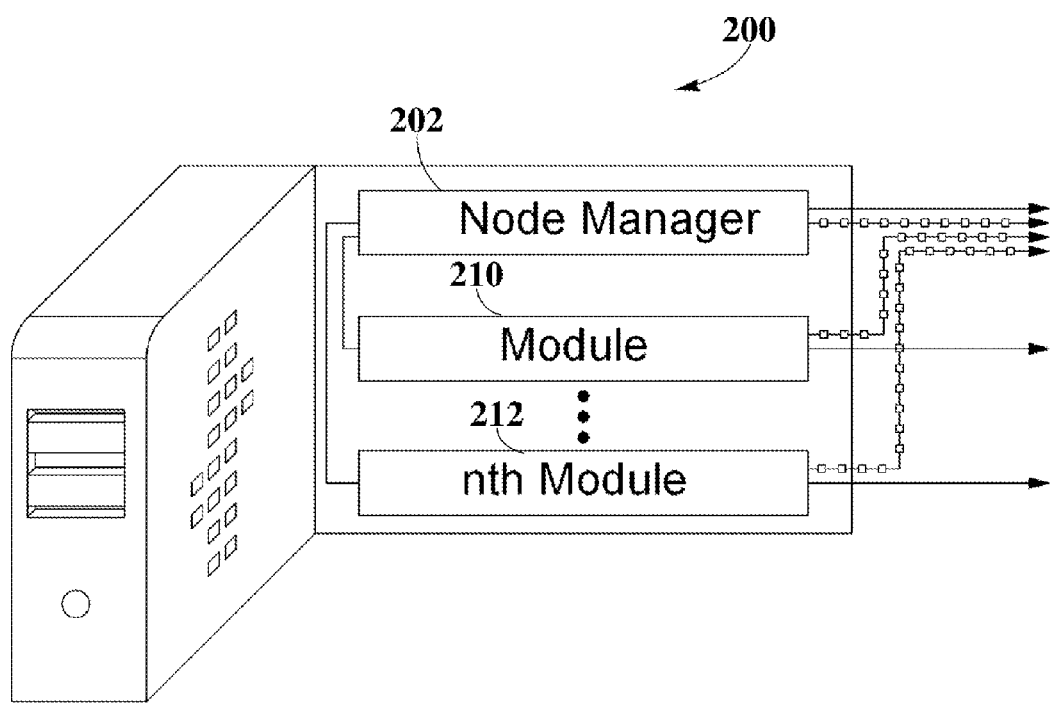
FIG. 2 shows an exemplary node configuration for a node in an exemplary system embodiment.

FIG. 2 is a diagram showing a configuration of a node 200, according to an exemplary embodiment. The node 200 in FIG. 2 may comprise a processor executing a node manager 202 software module and any number of additional software modules 210, 212, which may include a first software module 210 and up to nth module 212. The software modules may include any of the system modules, including search managers, search conductors, analytics agents, supervisors and dependency managers.

According to the exemplary configuration of FIG. 2, the node 200 may be communicatively coupled over a data network to a second node executing a supervisor module, or supervisor node. A node manager 202 be installed and executed by the node 200 may also configured to communicate with the supervisor node, and may also be configured to monitor a software modules 210, 212 installed on the node, including a first module 210, up to nth module 212. Node manager 202 may execute any suitable commands received from the supervisor, and may additionally report on the status of one or more of the node 200, node manager 202, and from the first module 210 to the nth module 212. The first module 210 may be linked to the one or more supervisors and may be linked to one or more other modules in the node, where other modules in the node may be of a type differing from that of first module 210 or may share a type with first module 210. Additionally, first module 210 may be linked with one or more other modules, nodes, or clusters in the system.

Node Redundancy

In one or more embodiments, one or more modules may have any suitable number of redundant copies in the system. Redundant copies of modules in the system may be stored in separate nodes.

For example, if a collection includes two partitions, a system may include a first search conductor including a first partition and a second search conductor including a second partition in a node; a first redundant copy of the first search conductor in a second node; a first redundant copy of the second search conductor in a third node; and a second redundant copy of the first search conductor and of the second search conductor in a fourth node. In some implementations, the logical and physical placement of redundant nodes in the system may be determined based on a maximum tolerance threshold associated with a function of the system. That is, the logical and physical location of redundant nodes may maximize the number of nodes which could possibly fail, but without rendering any single function unavailable to the system.

Fault Handling

Figure 3:
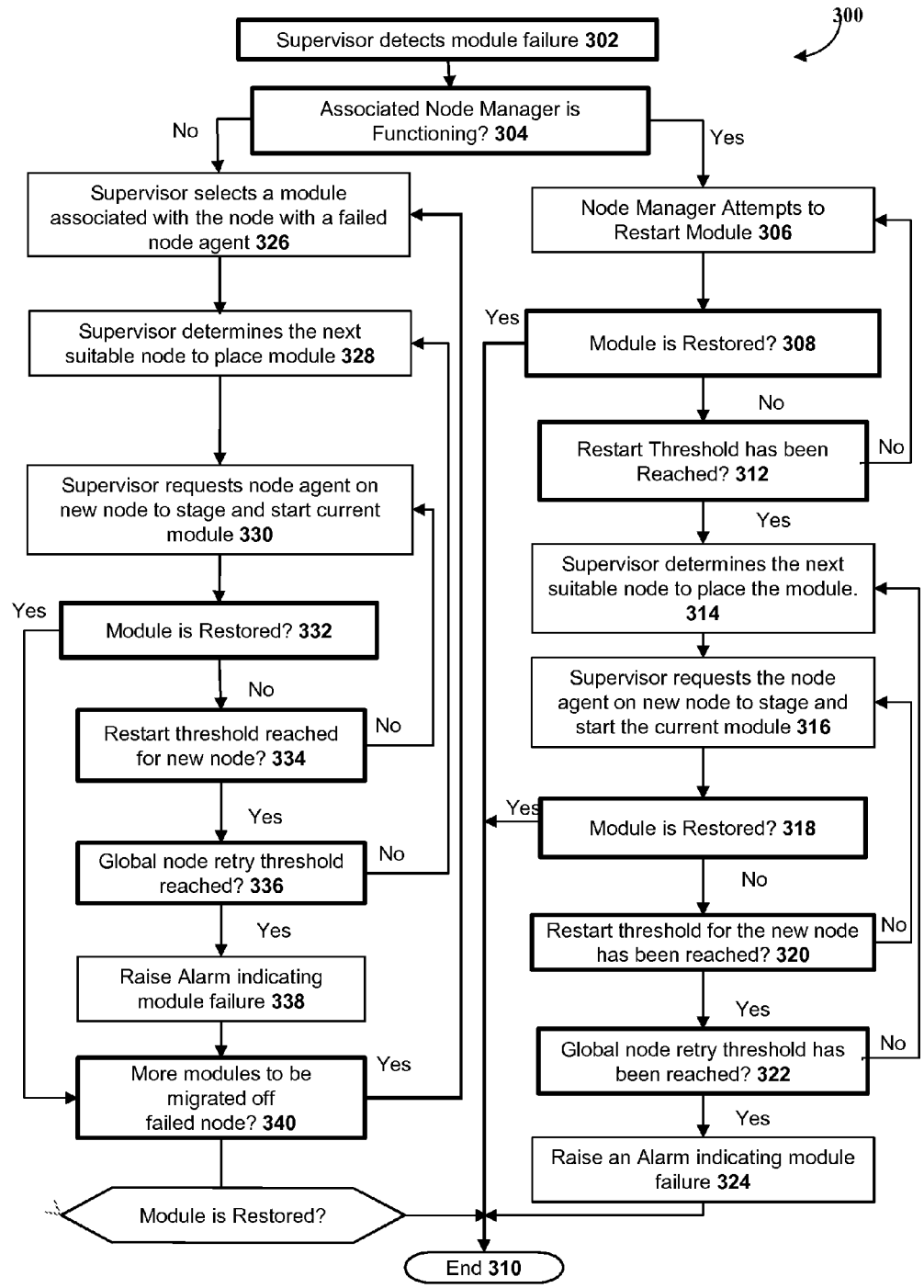
FIG. 3 is a flowchart showing fault handling by a distribute computing system, according to an exemplary method embodiment.

FIG. 3 is a flowchart for fault handling 300.

The supervisor maintains the definition and configuration of all data collections in the system, which may include settings per collection that indicate how many redundant copies of each partition are desired, how many times to try to restart failed components before moving them to another node, etc. The supervisor also maintains a list of available nodes and their resources, as provided by the node managers. From that information, the supervisor computes a desired system state by mapping the needed system modules to available nodes, while still complying with configuration settings. Fault handling 300 begins with supervisor detecting a module failure 302, where one or more supervisors may detect failures of one or more modules by comparing the actual system state to a desired system state. In one or more embodiments, supervisors may detect failure when one or more heartbeats from node managers or system modules are no longer detected. In one or more other embodiments, heartbeats from one or more modules may include status information about one or more other modules that may be interpreted by the one or more supervisors.

A supervisor may store definitions of data collections and the configurations settings associated with the data collections. The supervisor may also store information about available system resources, as reported by node managers. The configuration information may include settings per collection that indicate how many redundant copies of each respective partition are desired, how many times to try to restart failed components before moving them to another node, among other. From all this information, the supervisor derives a 'desired' system state that maps the needed system modules to available nodes, while still complying with configuration settings. All this information is represented as JSON objects which may be stored as JSON files on disk, or in a predefined data collection within the IMDB.

The supervisor may then detect if the associated node manager is functioning 304.

If the node manager associated with the one or more failed modules is functioning as desired or according to a status quo configuration, then supervisor may send one or more commands to the node manager instructing the node manager to attempt to restart the one or more failed modules, in a step 306.

The supervisor may then check if module is restored 308, and if so the process may proceed to end 310. In some implementations, the first action of any module is to report a status via heartbeats to one or more available supervisors. If it is determined that module function is not restored, as indicated by heartbeats, the supervisor may determine if the restart threshold has been reached 312. The threshold number of attempts is a configuration setting per collection, which may be set by the system administrator and stored with the supervisor. The supervisor determines that a module has failed and should be restarted or moved to another node. The supervisor sends commands to If the number of attempts has not been reached, the node manager attempts to restart module 306.

If the threshold has been reached, the supervisor determines the next suitable node to place the module 314 and the supervisor requests the node manager on the new node to stage all module dependencies and start the current module 316.

The supervisor may then check if module is restored 318, and if so the process may proceed to end 310. If the module is not restored, the system may check if the restart threshold for the new node has been reached 320. If the threshold has not been reached, the supervisor requests the node manager on the new node to stage and start the current module 316.

Otherwise, the supervisor may check if the global node retry threshold has been reached 322. This value is also defined by a system administrator and may be stored with the supervisor in a script, or as JSON or similar data structure object. If the threshold has not been reached, the supervisor determines the next suitable node to place the module 314 and attempts to restart the node on the new node. If the global threshold has been reached, the system may then raise an alarm indicating module failure 324.

If the supervisor detects that the associated node manager is not functioning based on the corresponding heartbeats, as indicated by a lack of heartbeats or heartbeats from the node manager indicating a failed state, the supervisor selects a module associated with the node with a failed node manager 326. Then, the supervisor determines the next suitable node to place the module 328. Afterwards, the supervisor requests the node manager on the new node to stage and start the current module 330.

The supervisor may then check if module is restored 332. If the module is not restored, supervisor checks if the restart threshold for the new node has been reached 334. If the threshold has not been reached, the supervisor requests the node manager on the new node to stage and start the current module 330.

If the threshold has been reached, the supervisor then checks if the global node retry threshold has been reached 336. If the threshold has not been reached, the supervisor determines the next suitable node to place the module 328 and attempts to restart the node on the new node. If the global threshold has been reached, the system may then raise an alarm indicating module failure 338.

Otherwise, if the module is restored, the supervisor then checks if there are more modules to be migrated off the failed node 340. If a node has failed, the supervisor is configured to migrate all of the services that had been running on the failed node 340, as defined in the desired state. The supervisor will calculate a new desired state without the failed node 340 and will need to migrate services accordingly. In some implementations, the supervisor may select a module associated with the node having a failed node manager 326 and the node manager attempts to stage and start the module.

If the supervisor determines no more modules are to be migrated, the process may end 310.

In one or more embodiments, a node may fail and a supervisor may determine, based on information from node manager heartbeats, that no nodes have available resources. In some implementations, the node managers report their available resources in each corresponding heartbeat. The supervisor may then attempt to make resources available in other nodes in the system while maintaining a desired redundancy. In one or more embodiments, resources may be made available by unloading a module or partition. The supervisor may then load the desired module or partition on the available resources.

Example #1 illustrates what happens if a single module fails due to some resource no longer available on the node but the node itself is not otherwise adversely affected.

In this case, when the module fails the heartbeat connections to the supervisor are dropped, thereby alerting the supervisor to the module failure. The supervisor will attempt to reconnect to the module to check if the failure was just a connection issue or a module failure. In some embodiments, failure to reconnect is assumed to be a module failure.

The supervisor will first request the associated node manager to restart the module in place. Starting the module in place does not incur the cost of re-staging the module and any corresponding software or data, so can be accomplished more quickly than staging and starting on another node. However, in this example the problem is due to some resource unavailability on the specified node, thus the restart will also fail.

After making a predetermined number of attempts to restart the module in place, the supervisor will look for another suitable node to start the module on. The supervisor will contact a dependency manager to acquire the correct package required to deploy the failed module. The supervisor will then pass that package on to the node manager for the newly selected node to stage and run the module. The module finds the required resources on the new node and creates a heartbeat connection to the supervisor indicating it is running properly. The supervisor marks the functionality as restored and the event is over.

Example #2 illustrates a total node fail such as a failed power supply. In this case the node manager and all modules on the server drop their heartbeat connections to the supervisor. The supervisor recognizes this as a complete node failure and marks that node as failed and unavailable. The supervisor then walks through the list of modules that were allocated to that node. For each module in that list the supervisor will look for another suitable node to start the module on. The supervisor will contact a dependency manager to acquire the correct package required to deploy the current module. The supervisor will then pass that package on to the node manager for the newly selected node to stage and run the module. The module executes and creates a heartbeat connection to the supervisor indicating it is running properly. The supervisor marks the functionality as restored for that module. This continues until all modules have been reallocated to new nodes and the event is over.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
   monitoring, by a computer comprising a processor executing a supervisor module, a heartbeat signal generated by a node manager monitoring one or more software modules stored on a node, wherein the heartbeat signal contains binary data indicating a status of each respective software module monitored by the node manager;
   detecting, by the computer, a failed software module in the one or more software modules of the node based on the heartbeat signal received from the node manager of the node;
   automatically transmitting, by the computer, to the node manager of the node a command instructing the node to restore the failed software module, in response to detecting the failed software module;
   determining, by the computer, whether the node manager successfully restored the module based on the heartbeat signal received from the node manager;
   determining, by the computer, a failover node to execute the failed software module when the node manager does not restore the failed software module within a threshold number of attempts;
   retrieving, by the computer, a configuration package associated with the failed software module from a dependency manager node;
   transmitting, by the computer, the configuration package to a failover node manager associated with the failover node, wherein the failover node manager attempts to install the module on the failover node, and wherein the failover node manager attempts to restore the failed software module;
   determining, by the computer, if the failover node manager successfully installed the failed software module on the failover node; and
   determining, by the computer, if the failover node manager successfully restored the failed software module.

2. The method according to claim 1, further comprising:
   determining, by the computer, a next failover node to execute the failed software module when the failover node manager fails to install the failed software module on the failover node or when the failover node manager fails to restore the failed software module within a threshold number of attempts;
   transmitting, by the computer, the configuration package to a next failover node manager associated with the next failover node;
   determining, by the computer, if the next failover node manager successfully installs the failed software module on the next failover node; and
   determining, by the computer, if the next failover node manager successfully restores the failed software module.

3. The method according to claim 2, further comprising generating, by the computer, a module failure alert after one or more next failover node managers exceed a global threshold number of attempts to restore the failed software module, wherein the computer sequentially determines a next failover node until the global threshold of attempts to restore the failed software module is met.

4. The method according to claim 1, further comprising:
- detecting, by the computer, a failure of the node manager monitoring the failed software module;
- determining, by the computer, a failover node to execute the module, wherein the failover node is associated with a failover node manager;
- retrieving, by the computer, a configuration package associated with the failed software module from a dependency manager node;
- transmitting, by the computer, the configuration package to the failover node manager, wherein the failover node manager attempts to install the failed software module on the failover node, and wherein the failover node manager attempts to restore the failed software module;
- determining, by the computer, if the failover node manager successfully installs the failed software module on the failover node; and
- determining, by the computer, if the failover node manager successfully restores the failed software module.

5. The method according to claim 4, further comprising:
- determining, by the computer, that the node is a failed node when the node is not functioning according to a status quo;
- determining, by the computer, one or more modules executed by the failed node to be migrated off of the failed node and restored at one or more new nodes;
- retrieving, by the computer, a configuration package for each of the one or more modules executed by the failed node from the dependency manager node; and
- transmitting, by the computer, each configuration package to the one or more new nodes.

6. The method according to claim 5, further comprising:
- determining, by the computer, a next new node having a set of available resources capable of installing and executing a module in the one or more modules migrated off of the failed node;
- instructing, by the computer, a new node manager of a new node storing the module to unload the module; and
- transmitting, by the computer, the configuration package to the next new node.

7. A fault-tolerant distributed computing system comprising:
- one or more nodes comprising a processor transmitting a heartbeat signal to a supervisor node and monitoring execution of one or more software modules installed on the one or more nodes;
- one or more supervisor nodes comprising a processor monitoring one or more heartbeat signals received from the one or more nodes, and determining a status of each respective node based on each respective heartbeat signal, wherein the processor of the one or more nodes is configured to attempt to restore a software module executed by the one or more nodes to a status quo configuration responsive to receiving a command to restore the software module from the supervisor node;
- a dependency manager node comprising non-transitory machine-readable storage media storing one or more machine-readable configuration package files; and
- the processor of the one or more supervisor nodes determines a number of attempts to restore the software module executed by the one or more nodes, and wherein the processor of the one or more supervisor nodes automatically retrieves from the dependency manager node a configuration package file associated with the software module responsive to determining the number of attempts exceeds a threshold number of attempts to restore the software module.

8. The system according to claim 7, further comprising a failover node comprising a processor transmitting a heartbeat signal to the supervisor node, wherein the failover node is configured to execute the software module.

9. The system according to claim 8, wherein the processor of the one or more supervisor nodes transmits the one or more configuration package files to the failover node in response to receiving the one or more configuration package files from the dependency manager node, and instructs the processor of the failover node to attempt to restore the software module.

10. The system according to claim 7, wherein a processor of the dependency manager node transmits a configuration package file of the one or more machine-readable configuration package files to the supervisor node in response to receiving from the supervisor node a request identifying the configuration package file.

11. The system according to claim 10, wherein the configuration package file is associated with a software module detected as a failure according to the node status of the heartbeat signal of the respective node executing the failed software module.

12. The system according to claim 11, wherein the one or more supervisor nodes transmits a resource-shifting command to a failover node responsive to determining that a node status of the failover node indicates that the failover node has insufficient resources to restore the failed software module.

13. The system according to claim 12, wherein a processor of the failover node automatically uninstalls an installed software module from the failover node in response to the resource-shifting command, and wherein the failover node attempts to install and restore the failed software module received from the supervisor node.

14. The system according to claim 10, further comprising a redundant node comprising a non-transitory machine-readable storage medium storing a redundant copy of a software module of the one or more software modules, and a processor configured to automatically attempt to execute the redundant copy of the software module responsive to receiving a command to restore the software module from the supervisor node instructing the redundant node to attempt to execute the redundant copy of the software module.

* * * * *